United States Patent [19]

Cetnarowski

[11] Patent Number: 4,555,979

[45] Date of Patent: Dec. 3, 1985

[54] FLUID-POWERED MULTIPLE PISTONROD LIFT UNIT

[76] Inventor: Robert Cetnarowski, 6080 Maple La., Pearl Beach, Mich. 48052

[21] Appl. No.: 637,894

[22] Filed: Aug. 6, 1984

[51] Int. Cl.$^4$ .......................... F01B 11/02; F16J 15/18
[52] U.S. Cl. ................................ 92/85 B; 92/165 PR; 92/166; 92/168; 92/169
[58] Field of Search ............ 92/165 PR, 165 R, 85 B, 92/51, 52, 166, 169.3, 168 R; 60/580

[56] References Cited

U.S. PATENT DOCUMENTS

| 1,940,800 | 12/1933 | Johansen | 92/165 R |
| 4,068,532 | 9/1974 | Descoteaux et al. | 74/27 |
| 4,252,361 | 3/1976 | Descoteaux et al. | 294/88 |
| 4,351,628 | 7/1978 | Drexel et al. | 92/165 PR |

FOREIGN PATENT DOCUMENTS

| 413 | 7/1899 | Austria | 92/52 |
| 642153 | 6/1962 | Canada | 92/52 |
| 2306630 | 9/1974 | Fed. Rep. of Germany . | |
| 2553987 | 6/1976 | Fed. Rep. of Germany | 92/85 B |
| 338559 | 3/1904 | France | 92/165 R |

OTHER PUBLICATIONS

Ex. A–Chilton's Product Design & Development Magazine, vol. 39, No. 7, Multi-Angle Rotary Actuator of Rotomation; p. 45.
Ex. B–Parker Fluid Power brochure, Hydraulic Cylinder Cushioning; of unknown date.
Ex. C–Aeroquip QR-70 Super Cushion brochure of unknown date.

Primary Examiner—Paul E. Maslousky
Attorney, Agent, or Firm—Burton, Parker & Schramm

[57] ABSTRACT

A fluid-powered lift unit having a plurality of pistonrods attached to a piston which translates axially but within a tube. The tube is provided with an end cap and a base which in conjunction with the piston defined two fluid-tight regions. The pistonrods extend from the piston and sealingly extend through the end cap thereby preventing piston rotation and causing the lift unit to be rigid with the piston in the extended or contracted position.

20 Claims, 6 Drawing Figures

FLUID-POWERED MULTIPLE PISTONROD LIFT UNIT

DESCRIPTION

1. Field of Invention

This invention relates to lift units acting along a linear axis and more particularly to fluid-powered lift units which are restrained from rotating.

2. Background of Invention

A number of various mechanical fluid-powered lift units have been employed for translating an object along a linear axis where the unit is restrained from rotating about the axis of translation. A typical hydraulic cylinder having a cylindrical bore, a piston and a pistonrod will freely rotate unless mechanical structure is added to prevent the piston from turning in the cylinder. An example of a structure designed to prevent piston rotation is shown in German Pat. No. 2,306,630 (Schlieckmann). The Schlieckmann device employs a pair of guide rods extending the length of the cylinder and passing through the piston. A single piston rod of a conventional design is affixed to the piston and can be translated linearly in a normal manner. An alternative approach for restraining the rotation of a hydraulic cylinder having a central shaft coupled to the piston may be seen in U.S. Pat. No. 4,252,631 (Descoteaux) and in U.S. Pat. No. 4,351,628 (Drexel). These two patents disclose a unit for translating an article along a linear axis employing a hydraulic cylinder and a single guide rod remotely mounted outside of the cylinder having an axis parallel to that of the cylinder. An alternative vertical lift unit is shown in U.S. Pat. No. 4,068,534 (Descoteaux) which employs a rack and pinion mechanism for moving a carriage linearly relative to a frame to which it is slideably supported.

A significant disadvantage of the hydraulic cylinders having internal guide rods is that the pistonrod, particularly if long, is not rigid. Increasing the pistonrod diameter to decrease the tendency to bend will result in decreasing the effective area of the piston. Adding external guide rods as suggested by Drexel satisfactorily increases rigidity, however, the unit becomes bulky and cumbersome. The mechanical lift unit approach as disclosed in the U.S. Pat. No. 4,068,534 patent is also bulky, slow to operate and requires a great deal of machining.

SUMMARY OF INVENTION

I have discovered a fluid-powered, multiple pistonrod lift unit which is compact, powerful relative to its size, restrained from rotation about the axis of translation and very rigid when loaded lateral to the axis of translation. My novel fluid-powered, multiple pistonrod lift unit is basically comprised of a tube assembly having an internal axial cavity and means for sealing each end. A piston is located within the tube sealingly engaging the tube wall and free to slide along the tube's axis. The piston thereby divides the tube into a first region on one side of the piston and a second region on the other side of the piston. The unit is provided with means to admit fluid into and out of at least one of the first or second regions in order to move a piston and pistonrods axially relatively to the tube between a first point and a second point on the tube axis which represent the maximum travel with a piston in either direction. A plurality of pistonrods are affixed at one end to the piston and project through the sealing means of at least one end. The pistonrods are spaced from one another and are parallel to the axis of the tube. Preferably, a top plate is attached to the end of the pistonrod opposite the piston thereby forming a rigid piston assembly comprised of the top plate, piston and pistonrods, which translate linearly relative to the tube assembly.

DESCRIPTION OF PREFERRED EMBODIMENT

Figure 1:
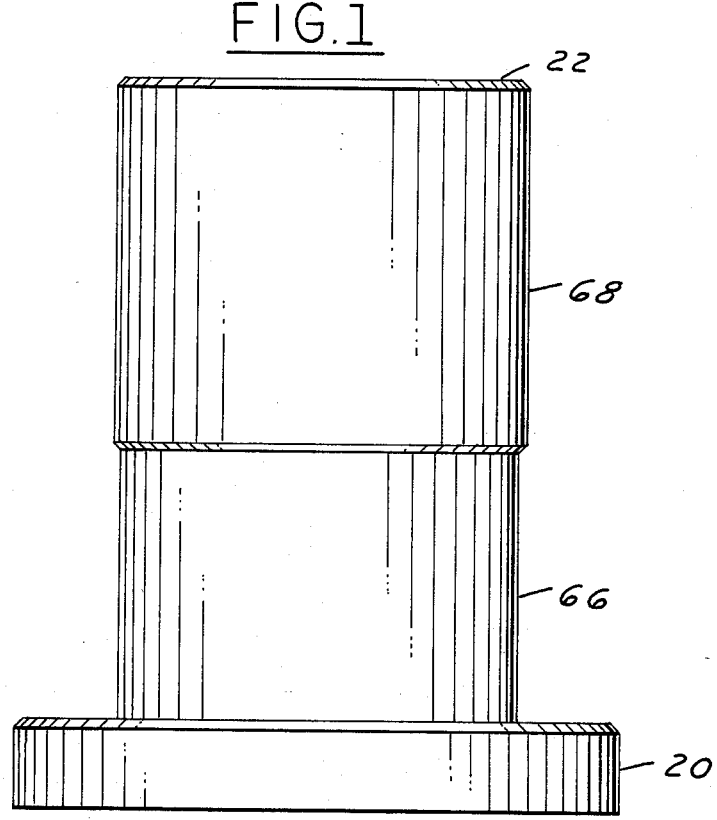
FIG. 1 is a side view of fluid-powered, multiple pistonrod unit.
Figure 2:
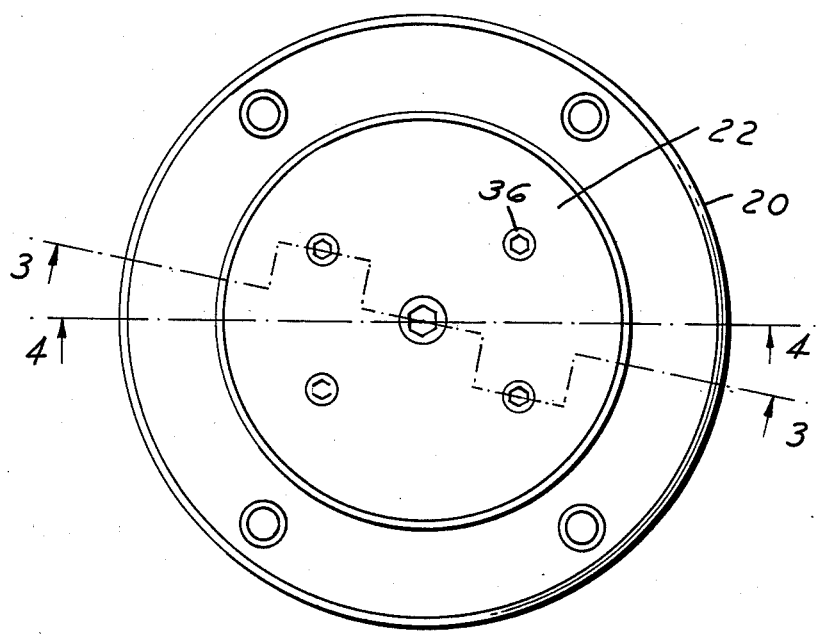
FIG. 2 is a top plan view.

Referring to the drawings, the preferred embodiment of the novel lift unit is described. The basic components of my invention comprise tube 10, provided with a cylindrical core and having a first end 12 and second end 14. Within the tube is a piston 16, slideable along the tube axis and sealingly cooperating with same. The first end of the tube sealingly engages the end cap 18 and the second end of the tube sealingly engages the base 20. The plurality of pistonrods are affixed at one end to the piston and sealingly extend to the end cap 18 and are attached to top plate 22. The top plate, the piston and the pistonrods extending therebetween form a single rigid piston assembly. The end cap 18 provides a first sealing means cooperating with the first end of the tube to establish a first fluid-tight region which is bounded by the piston and tube wall.

While the preferred embodiment uses an end cap structure to provide a seal means, a number of alternative methods of defining a fluid-tight first region are within the scope of this invention. Similarly, base 20 provides a second sealing means for cooperating with the second end of the tube to establish a second region bounded by a piston and tube wall. The invention is not limited to specific base plate structure disclosed as any number of methods of establishing a fluid-tight region could provide a similar function. The first or second seal means could alternatively be a fluid-tight cavity affixed to one end of the tube or even another piston assembly which may be slideable axially along the bore of the tube. In addition, the preferred embodiment herein described and shown in the drawings which have pistonrods extending only from one side of the piston, it is well-known in the art to form a double-ended hydraulic cylinder having a piston rod extending through both the base and end cap as shown in the Drexel patent. The alternative embodiment hereinafter described in detail is not intended to limit the scope of the claimed invention.

The piston sealingly cooperating with the tube wall divides the interior cavity of the tube into a first region 24 bounded by the end cap, the piston and the tube wall and a second region 26 bounded by the base the piston and the tube wall. The piston is provided with seal means such as elastic O-rings seals 25, which fit into peripheral grooves formed in piston 16. The apparatus is further provided with means to permit fluid to enter into and out of at least one of the first and second regions in order to move the piston and pistonrods axially relative to the tube. In the embodiment depicted in the drawings, the first port 28 provides a means to admit fluid into and out of the first region and a second port 30 communicates with the second region 26. Any conventional fluid may be employed with this apparatus such as air or hydraulic fluid.

The embodiment of the invention shown in the drawings uses five pistonrods, central pistonrod 32 and four radially-spaced pistonrods 34. Any number of pistonrods may be used within the scope of this invention provided that there are no fewer than two. The number and diameter of the piston rods will vary depending upon the load to be carried by the unit and the desired rigidity. A central pistonrod, while depicted in the drawings, is not necessary. Three pistonrods spaced a maximum distance apart will provide a very rigid piston assembly with minimum weight, and minimal reduction in piston cross-section area. Whenever a hydraulic cylinder is fabricated where the pistonrod exists through one end of the tube assembly only, the area of piston on the side containing the piston rod is thereby reduced by the cross-sectional area of the rod. Three small diameter piston rods employed in this invention will have a much greater rigidity to bending than a single piston rod of comparable total cross-sectional area and weight.

The pistonrods are attached to the piston and top plate using any conventional mechanical means. As shown in the drawings, radial piston rods 34 may be attached to piston 16 and top plate 22 using conventional socket head bolts 36. In order to prevent leakage of fluid out of a first region 24 radial pistonrods 34 are provided with a peripheral annular groove for retention of O-ring seals 38. In order to prevent fluid from leaking between the piston rods and the end cap 18 each pistonrod is provided with a seal 40 which is retained in an annular cavity in the end cap. In order to prevent wear in the end cap from pistonrod travel, suitable bearings or bushings are mounted therein for cooperation of the pistonrods. In the drawings central pistonrods 32 cooperates with bushing 42 mounted in end cap 18. Radial pistonrods 34 are shown slideably cooperating with roller bearing unit 44 also mounted in end cap 18. Whether roller bearings or bushings are chosen is merely a matter of design choice.

Figure 3:
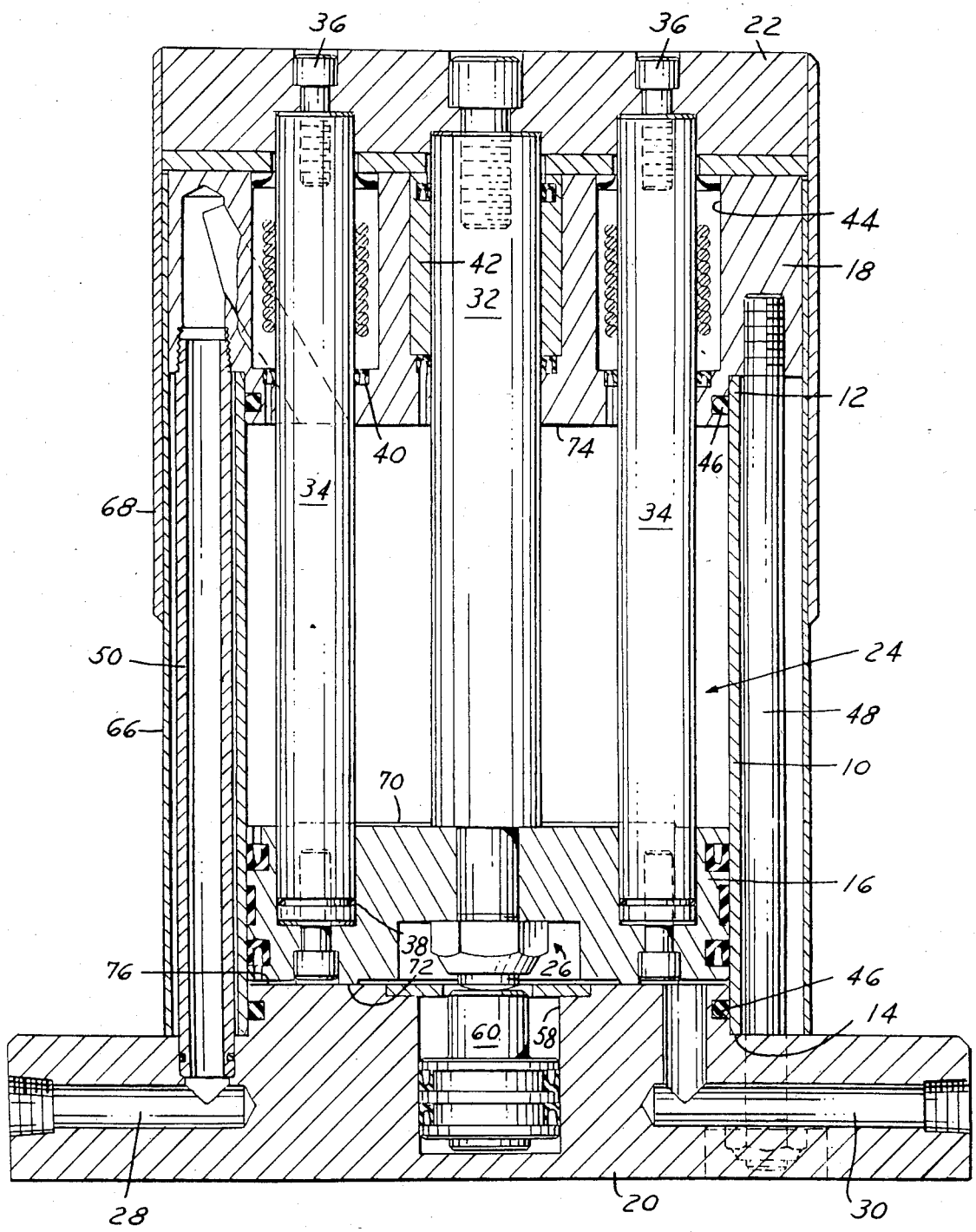
FIG. 3 is an enlarged cross-sectional view taken along line 3—3 in FIG. 2.
Figure 4:
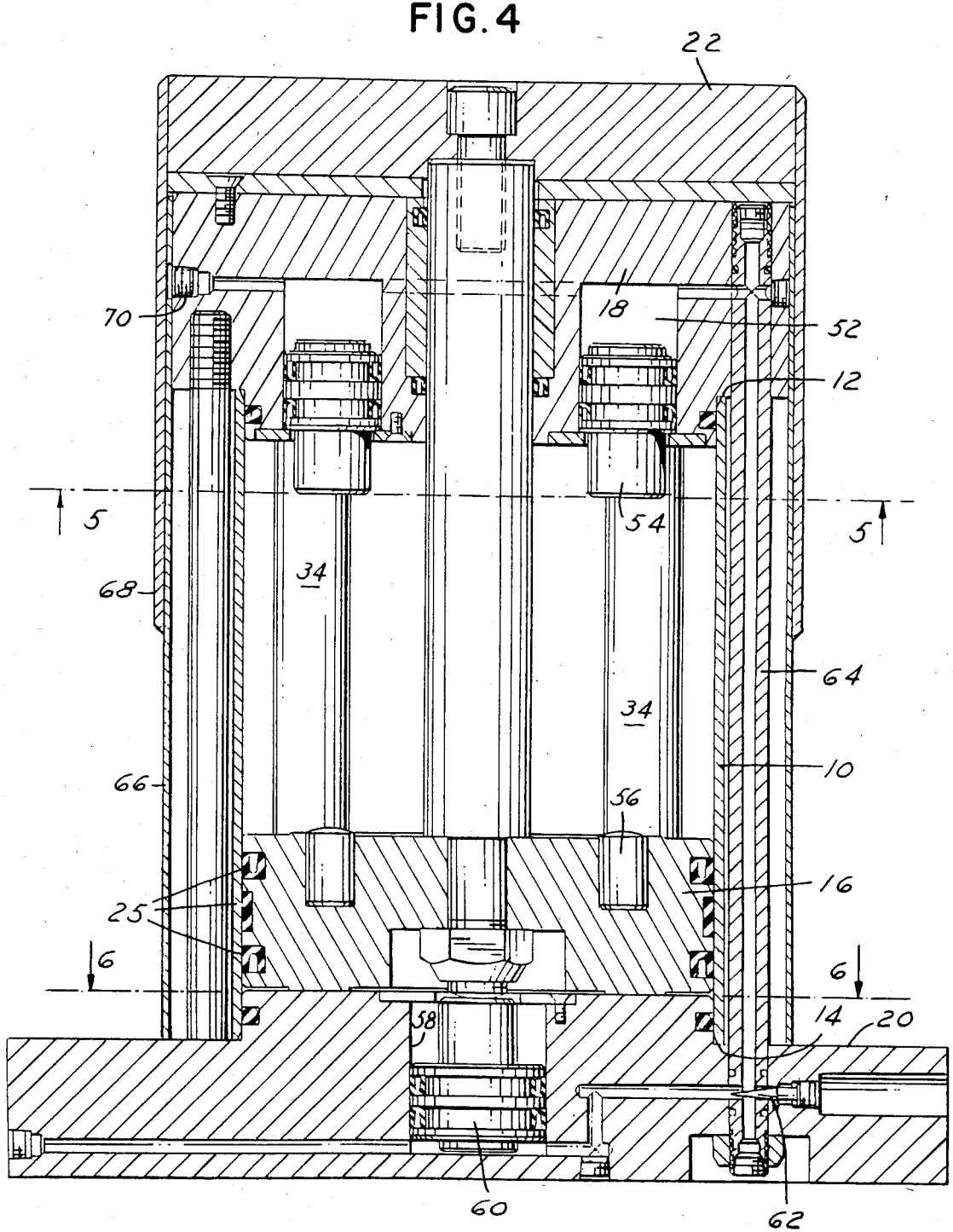
FIG. 4 is an enlarged cross-sectional view taken along line 4—4 in FIG. 2.
Figure 5:
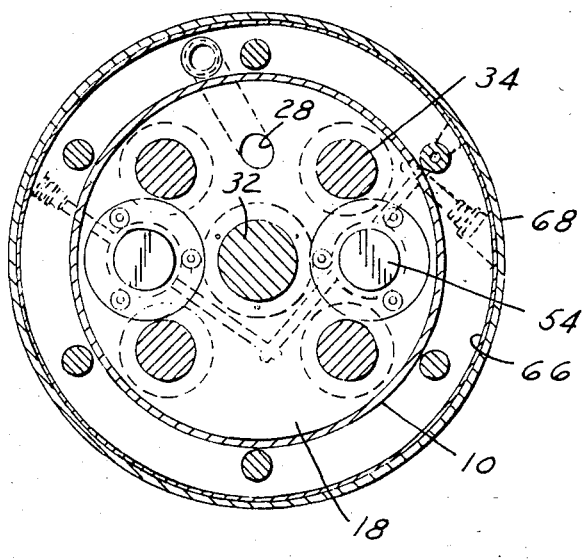
FIG. 5 is a cross-sectional view taken along line 5—5 in FIG. 4.
Figure 6:
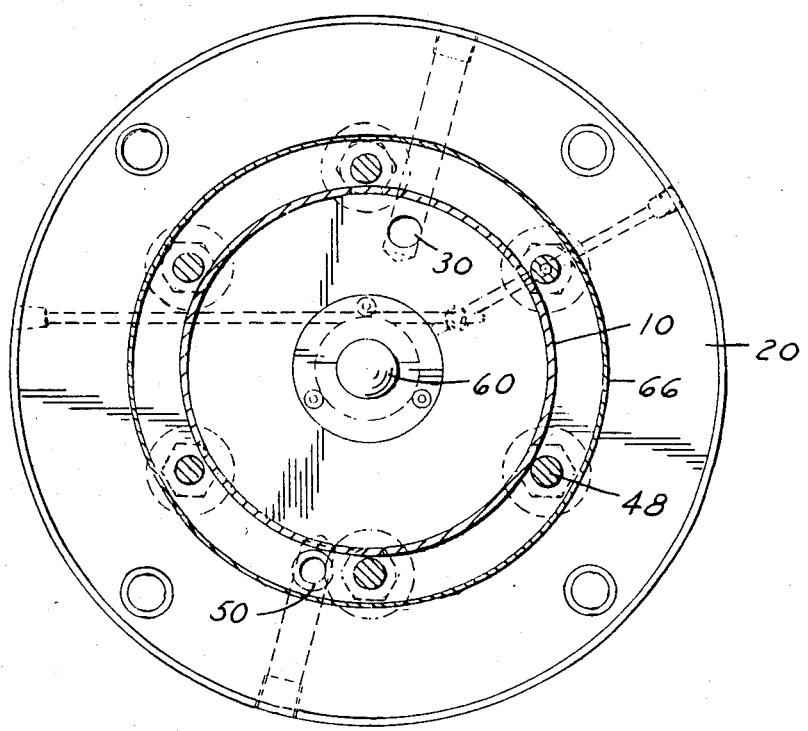
FIG. 6 is a cross-sectional view taken along line 6—6 in FIG. 4.

In order to prevent leakage of fluid past the junction between the first end of the tube and end cap 18 a suitable seal must be provided. Shown in FIGS. 3 and 4, O-ring seal 46 may be installed in a peripheral groove in the end cap having a surface corresponding to the shape of the first tube end for slideably receiving same. A similar O-ring seal is provided in base 20, which has a surface corresponding in shape of the tube for slideably cooperating with the second end of the tube 14. In the preferred embodiment, the tube assembly comprised of the base, the end cap, and the tube is held together axially by a plurality of column members or studs 48 extending from the end cap 18 to the base 20. Studs 48 as shown in FIG. 4 are loaded in tension and result in the tube 10 being column loaded, compressed between end cap 18 and base 20. Alternatively studs 48 could be eliminated if tube 10 was fixed directly to the base and end cap.

It is convenient to have both the first port 28 and second port 30 which communicate with the first and second regions of the cylinder to be located in base 20. Port 30, therefore, as shown in FIG. 3 may further comprise tube 50 extending between the portion of the second port 30 in the base and the portion located in the end cap. Tube 50 is provided with appropriate seal means such as O-ring located in a peripheral groove as shown to prevent leakage between the tube and the base or end cap.

In order to gradually decelerate the piston assembly as it reaches its end of travel, suitable cushion means may be provided. When a gaseous working fluid is used with this invention, it is quite desirable to include cushion means to gradually decelerate the piston. When a liquid working fluid such as hydraulic oil is used, piston travel can be controlled by restricting the flow of liquid into and out of the chamber with an orifice or variable restrictor. However, the cushion system shown in the drawings described below will work quite satisfactorily in a gas or liquid device. A cross-section showing a preferred embodiment of th hydraulic cushion system for both ends of the piston travel is shown in FIG. 4. Maximum travel of the piston is between a first point on the cylinder axis when the piston is engaging end cap 18 and a second point on the axis when the piston engages base 20. In order to decelerate the piston a cushion is constructed by forming a plurality of cylindrical bores 52 in the end cap having an axis parallel to that of the tube. Within each cylindrical bore is a spool 54 sealably mounted therein slideable along the axis of the cylindrical bore 52. The spool 54 and the cylindrical bore define an enclosed volume which is filled with a suitable cushion fluid. The cushions in the end cap are connected to the cushion in the base with a passageway to allow the fluid to be transferred therebetween as the spools are displaced by piston. Shortly before the piston reaches the first point on the axis which represents the maximum travel in the direction of the end cap, spool 54 engage the piston and provide a means for gradually decelerating the piston assembly prior to the piston striking the end cap. In order to prevent wear on the piston in the region of spool at the point of contact, hardened inserts 56 are installed in the piston.

A single cushion means can be installed in the basein order to gradually decelerate the piston as it approaches the second point on the axis which represents its maximum travel in the direction of the base. Similarly, when no central pistonrod is employed a single central cushion may be used in the end cap. The central cushion in base 20 is comprised of a cylindrical bore of 58 formed in the base into which is fitted a spool 60 sealingly cooperating with the cylindrical bore using suitable seal means. The cavity defined by the cylindrical bore 60 and 58 is perferably connected to the cavities corresponding with the cushion means in the end cap. Therefore, when the piston shown in FIG. 4 moves toward the end cap the hardened inserts on the piston would engage spools 54 displacing the cushion fluid into the cavity of the cushion in the base raising at the spool 60 for the next contact. Variable restricted orifice 62 may be installed in the interconnecting passageways to vary the rate of deceleration of the piston assembly as it strikes the cushion. Tube 64 carrying the cushion fluid is shown extending from the base to the end cap 18.

When the piston is at either extreme end of its travel, it is desirable to hold the piston as rigidly as possible relative to the tube assembly. Both the sides of the piston, 70 and 72, and the corresponding portions of the base 74 and end cap 76 are provided with flat surfaces machined parallel to one another. FIGS. 3 and 4 show piston 16 positioned at one extreme end of its axial travel with machined portion 72 on the piston firmly engaging machined portion 76 on the base. Note that the first region 24 is at its maximum volume and second region 26 is at its minimum volume causing the unit to be contracted to its minimum overall height position shown. When firmly held in place by the pressure in the opposite region, the piston and end cap or piston and base contact the machined surfaces to provide a rigid unit. This feature is particularly important when the piston is completely extended. Minor movements of the piston laterally within the tube are amplified at the end of the unit where a workpiece is attached to the end plate 22.

In order to prevent the pistonrods from being exposed to dirt and debris and to give the unit a neat, clean appearance, a pair of coaxially telescoping shrouds may be installed on the device. A first shroud 66 having a wall portion and two ends is fixed to the cylinder assembly. First shroud 66 is preferably attached to the base 20 and/or end cap 18 so that the wall of the shroud completely surrounds the tube 10, studs 48 and smaller diameter tubes 50 and 62. A second shroud 68 having a wall portion and two ends telescopically cooperates with the first shroud 66. One end of the second shroud is fixed to top plate 22. The other end of the second shroud is free, allowing the second shroud, which is preferably larger in diameter than the first shroud, to telescopically slide over the first shroud to provide a neat aesthetic appearance while preventing the working parts of the unit from being exposed.

A typical use for the fluid-powered multiple lift unit would be in an industrial robot for automated machining operation, or a light press, where the unit would cycle between a fully extended position and a fully contracted position. To fully extend the unit the first region 24 is vented to atmosphere and second region 26 is pressurized causing the piston 16 to translate axially in tube 10 until machine surface 70 on the piston 16 contacted machined surface 74 on end plate 18. As earlier described, prior to piston 16 striking the end plate, hardened insert 56 formed in piston 16 with engage spools 54 which form a cushion means in the end cap to gradually decelerate the piston. The cushion fluid contained in the cylindrical cavity provided by cylindrical bore 52 and spool 54 would be displaced through cushion plate passageway and tube 64 past restrictive opening 62 and into the cylindrical cavity defined by cylindrical bore 58 in the base and spool 60. When it is desired to move the unit to its contracted position, the second region 26 is vented to atmosphere via second port 30 and the first region 24 is pressurized via first port 28 causing piston 16 to move axially along the bore until surface 62 on piston 16 engages surface 76 on the base which represents a maximum of travel in one direction. Prior to the piston contacting the base portion of the piston contacts spool 60 which provides a cushion means thereby displacing the cushion fluid retained in the cavity defined by cylindrical bore 58 and spool 60.

It will be understood, of course, that while the form of the invention herein shown and described constitutes a preferred embodiment of the invention, it is not intended to illustrate all possible forms. In the event that the piston strikes the cap or the base with excessive force causing extreme pressure in the cushion-fluid system, the device may be divided with a pressure release. End cap 18 shown in FIG. 4 is provided with a safety blow-up plug 70 in the cushion fluid passageway.

For example in the device shown in the drawings, its position having the axis of the tube in the vertical orientation with the base being at the bottom. Obviously, this device could be oriented horizontally or inverted as would be the case when used as a press.

It will also be understood that the words used are words of description rather than limitation and that various changes may be made without departing from the spirit and scope of the invention herein disclosed.

I claim:

1. A fluid-powered, multiple pistonrod lift unit telescopically extendable linearly along an axis and resistent to bending caused by transverse loads, comprising:
   a tube having an internal axial cavity defined by a tube wall and a first and second end portion;
   a piston sealingly cooperating with the tube wall and slideable along the axis thereof;
   first sealing means cooperating with said first end of the tube establishing a first region bounded by said first sealing means, said piston and the tube wall;
   a second sealing means cooperating with the second end of the tube establishing a second region bounded by the second sealing means, said piston and the tube wall;
   at least three piston rods parallel to said axis and not lying in a common plane each attached to said piston and slideably extending through at least one of said first and second sealing means; and
   means to admit fluid into and out of at least one of said first and second regions in order to move the piston and pistonrods axially relative to said tube between a first point and second point on said axis which represent the maximum travel of the piston in the extended and contracted directions respectively;
   whereby said plurality of pistonrods prevent relative rotation between the piston and the tube and provide a rigid structure resistant to bending caused by said transverse loads.

2. The invention of claim 1 wherein both first and second regions are fluid tight enabling the piston to be moved in either direction along said tube axis by varying the relative pressures in the first and second regions.

3. The invention of claim 2 wherein said first sealing means further comprises an end cap and said second sealing means further comprises a base member.

4. The invention of said claim 3 further comprising a top plate attached to said pistonrods wherein said pistonrods extend from the piston to the end cap and are attached to said top plate to form a rigid piston assembly.

5. The invention of claim 4 further comprising sealing means fitted to said end cap through which said piston rods may slide axially while retaining same transversly.

6. The invention of claim 5 further comprising a plurality of column members, each having two ends, one end cooperating with said end cap and the other cooperating with said base, said column members located outside the tube internal cavity and spaced about the tube wall.

7. The invention of claim 6 wherein said end caps and base are provided with a surface corresponding to the shape of the tube end portions for slideably receiving same, said end cap, tube, and base being held together in a fluid-tight manner by said column members.

8. The invention of claim 4 wherein said plurality of pistonrods are equally spaced from the axis of said tube and one another.

9. The invention of claim 4 having four or more piston rods wherein one pistonrod is located on the tube axis and the remaining pistonrods are equally spaced from said axis and one another.

10. The invention of claim 5 further comprising a first shroud having a wall portion and two ends, one end fixed to said base and the other end fixed to said end cap so that the shroud wall surrounds said tube.

11. The invention of claim 10 further comprising a second shroud having a wall portion and two ends, one end fixed to said top plate and the other end being free, for telescopically cooperating with said first shroud.

12. The invention of claim 4 further comprising first cushion means to gradually decelerate the piston as it approaches said first point and second cushion means to gradually decelerate the piston as it approaches said second point.

13. The inventions of claim 12 wherein:
said first cushion means further comprises at least one fluid-filled cylindrical bore formed in said end cap having an axis parallel to that of said tube, each bore having a spool sealingly mounted therein for engagement with the piston as it approaches said first point thereby varying the displacement of the cavity defined by said cylindrical bore and said spool, and
said second cushion means further comprises at least one fluid-filled cylindrical bores formed in said base having an axis parallel to that of said tube, each bore having a spool sealingly mounted therein for engagement with the piston as it approaches said second point thereby varying the displacement of the cavity defined by said cylindrical bore and said spool.

14. The invention of claim 13 further comprising a cushion fluid passageway connecting the cylindrical bores of the first and second cushion means having a variable restricted opening therein, for controlling piston deceleration.

15. The invention of claim 14 wherein the sum of the areas of the cylindrical bores comprising said first cushion means is substantially equal to the sum of the areas of the cylindrical bores comprising said second cushion means.

16. A fluid-powered, multiple pistonrod lift unit telescopically extendable linearly along an axis and resistent to bending caused by transverse loads comprising:
a base;
a tube having an internal cylindrical cavity defined by a tube wall and a first and second end portion sealingly cooperating with said base;
a piston having two oppositely disposed faces and a peripheral edge located within said tube cavity with said peripheral edge sealingly cooperating with the tube wall and slideable along the axis thereof;
three or more pistonrods each having a first and second end, the first end attached to and extending from one face of said piston, said pistonrods being parallel to one another and said tube axis and not lying in a common plane;
an end cap sealingly cooperating with said first tube end, said end cap provided with pistonrod guide means through which said plurality of pistonrods sealingly extend allowing relative movement between said pistonrods and said end cap as the piston slides within the tube;
a top plate affixed to the secured ends of the pistonrods so that each pistonrod extends through the end cap and is attached to the piston at one end and the top plate at the other end; and
passage means to admit fluid into and out of a first fluid-tight region bounded by said end cap, said piston and tube wall and a second fluid-tight region bounded by said base, said piston and said tube wall, enabling the piston to be moved axially relative to said tube between a first point and a second point on said tube axis whereby said plurality of pistonrods prevent relative rotation between the piston and the tube and provide a rigid structure resistent to bending caused by said transverse loads.

17. The invention of claim 16 further comprising a first cylindrical shroud fixed to the base and end cap and surrounding said tube, and a second cylindrical shroud fixed to the top plate and telescopically projecting over said first shroud.

18. The invention of claim 17 further comprising a first cushion means for gradually decelerating the piston as it approaches said first point on the axis and a second cushion means to gradually decelerate the piston as it approaches said second point on the axis.

19. The invention of claim 18 wherein said piston is at said first point, a face of the piston contacts said end cap and when said piston is at said second point the opposite face contacts said base to prevent relative movement therebetween.

20. A fluid-powered, multiple pistonrod lift unit telescopically extendable linearly along an axis and resistent to bending caused by transverse loads comprising
a base;
a tube having an internal cylindrical cavity defined by a tube wall, and a first and second end portion, said second tube end being sealingly fixed to said base;
a piston having two oppositely disposed faces and a peripheral edge, said edge sealingly cooperating with the tube wall and, slideable along the axis thereof, said piston dividing the internal tube cavity into a first region bounded by the tube wall and a piston face and the first tube end, and a second region bounded by the tube wall, the base and the other piston face;
at least four pistonrods not lying in a common plane and each having a first and second end, one pistonrod being coaxial with said tube, with the remaining pistonrods equally spaced from and parallel to said coaxial rod and one another, each pistonrod having its first end fixed to the piston whereby said plurality of pistonrods prevent relative rotation between the piston and the tube and provide a rigid structure resistent to bending caused by transverse loads.

* * * * *

UNITED STATES PATENT AND TRADEMARK OFFICE
CERTIFICATE OF CORRECTION

PATENT NO. : 4,555,979
DATED : December 3, 1985
INVENTOR(S) : ROBERT CETNAROWSKI It is certified that error appears in the above-identified patent and that said Letters Patent is hereby corrected as shown below:

In Claim 13. Col 7, line 26, delete the word ---bores--- and insert in its place the word "bore".

Signed and Sealed this

Seventeenth Day of June 1986

[SEAL]

Attest:

DONALD J. QUIGG

Attesting Officer

Commissioner of Patents and Trademarks